Feb. 27, 1945.  J. W. McCORMACK  2,370,477
COASTER CYCLE
Filed April 10, 1944

INVENTOR:
J. W. McCormack
BY
Fishburn + Mullendore
ATTORNEYS.

Patented Feb. 27, 1945

2,370,477

UNITED STATES PATENT OFFICE 2,370,477

COASTER CYCLE

J. W. McCormack, Kansas City, Mo.

Application April 10, 1944, Serial No. 530,258

10 Claims. (Cl. 280—87.02)

This invention relates to vehicles, particularly a coaster cycle, and has for its principal object to provide a vehicle of this character that is of strong, rigid construction and which may be comfortably operated both as a coaster and as a foot-propelled vehicle.

Other objects of the invention are to provide a simple and inexpensive frame structure; to provide a steering post adapted for simplified mounting on the supporting frame of the vehicle; to provide a brake mechanism having few parts; and to provide a construction which is adapted to use of wood materials.

In accomplishing these and other objects of the invention, I have provided improved structure, the preferred form of which is illustrated in the accompanying drawing wherein.

Figure 1:
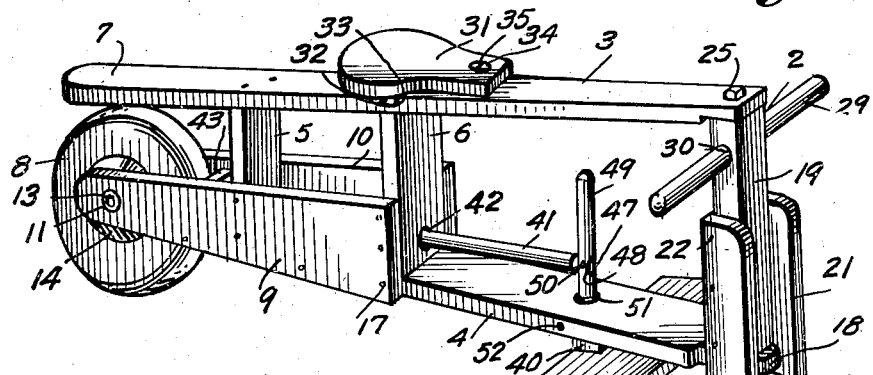
Fig. 1 is a perspective view of a coaster cycle constructed in accordance with the present invention.

Referring more in detail to the drawing:

1 designates a coaster cycle constructed in accordance with the present invention and which includes a frame 2 comprising upper and lower members 3 and 4 converging rearwardly thereof and supported in fixed spaced relation by spacers 5 and 6.

The upper and lower members 3 and 4 including the spacers 5 and 6 may be formed of boards having the same width so that the side edges thereof lie in common planes. The upper member 3 is of greater length than the lower member 4 so as to provide a guard portion 7 extending over the rear wheel 8 which is mounted directly to the rear of the terminal end of the lower member 4 and between side members 9 and 10. The side members 9 and 10 have their forward ends secured to the sides of the front spacer and overlap the sides of the rear spacer with the lower edges thereof coextensive with the sides of the member 4 as shown in Figs. 1 and 2.

The ends of the side members terminate slightly short of the guard portion 7 of the upper member and have registering transverse openings 11 and 12 for mounting the ends of an axle 13. The axle 13 preferably comprises a tube and the ends are pressed within the openings so as to prevent dispositioning thereof.

Figure 4:
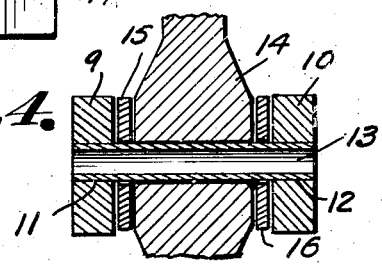
Fig. 4 is a detailed section through the rear axle and hub portion of the rear wheel on the line 4—4 of Fig. 3.

The wheel 8 includes a hub portion 14 that is rotatably mounted on the axle as best shown in Fig. 4, and the hub is spaced centrally between the side members by washers 15 and 16 inserted on the axle between the ends of the hub 14 and the inner faces of the side members 9 and 10 of the frame. The upper edges of the side members are preferably parallel with the upper longitudinal member of the frame. The upper and lower longitudinal members as well as the side members 9 and 10 may be attached to the spacers by suitable fastening devices such as screws or nails as indicated at 11. The forward end of the lower member is provided with a tongue portion 18 which cooperates with the forward end of the upper member to mount a steering post 19 therebetween. The steering post is also preferably formed of rectangular stock conforming in width to the width of the longitudinal members and has arms 20 and 21 attached to the sides thereof by suitable fastening devices such as nails 22 with the lower ends thereof depending below the lower member to carry an axle 23 therebetween and which journal a steering wheel 24.

Figure 2:
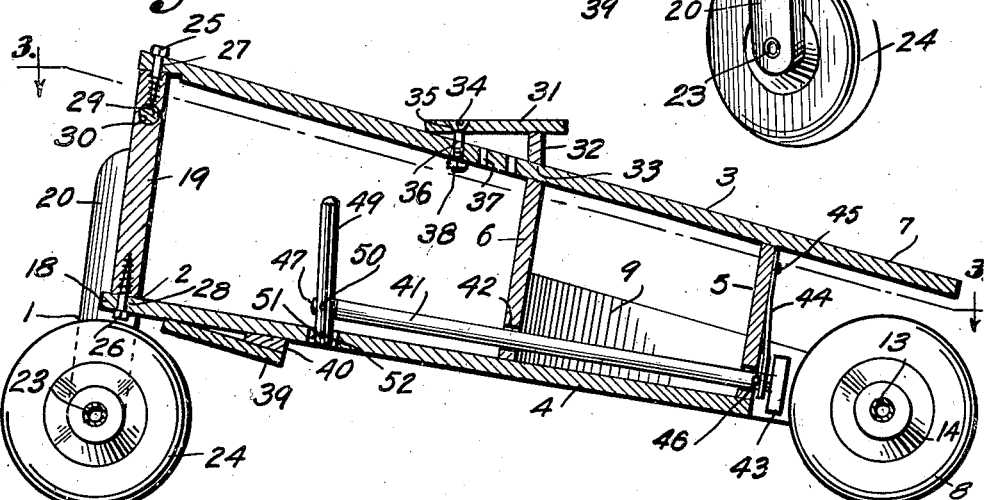
Fig. 2 is a central longitudinal section through the coaster cycle.
Figure 3:
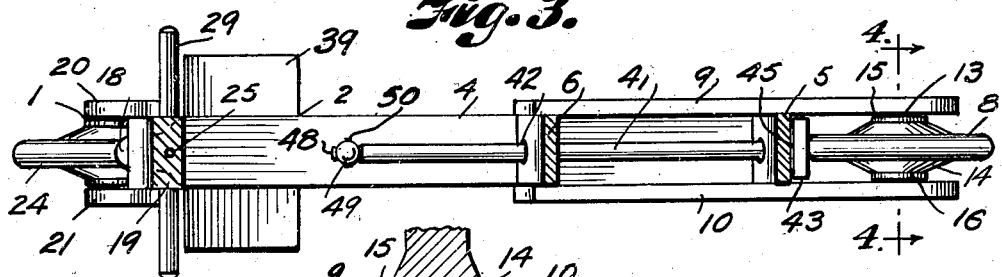
Fig. 3 is a horizontal section on the line 3—3 of Fig. 2.

The steering post is pivotally retained to turn on a substantially vertical axis by means of lag screws 25 and 26 that respectively extend through openings 27 and 28 in the upper and lower members respectively and which are threaded into the ends of the post as shown in Fig. 2. The steering post is also provided with a handle bar 29 that extends through an opening 30 in the post, the opening being located so that the point of the lag screw 25 anchors the handle bar in position.

Mounted on the upper member 3 above the forward spacer is a seat 31 supported in substantially level position by a prop 32 attached to the underside of the seat and having a notched lower portion 33 for engaging the upper longitudinal member 3 to prevent lateral movement of the seat. The seat is adjustably mounted on the upper member and is retained in adjusted position by a fastening device such as a bolt 34 having the head 35 thereof countersunk in an opening at the forward end of the seat and the shank 36 extending into one of a series of openings 37 provided in the upper longitudinal member as shown in Fig. 2. The shank of the bolt is provided with a nut 38 whereby the seat may be drawn into clamping engagement with the upper longitudinal member.

The lower longitudinal member is preferably provided forwardly of the seat with a footboard 39 preferably supported in inclined position by a spacer block 40 mounted between the rear edge of the board and the underface of the lower longitudinal member as shown in Fig. 2, the footboard being secured by nailing or the like.

The coaster is preferably provided with a brake which includes a brake rod 41 slidably supported in openings 42 in the spacers 5 and 6 and which has a brake shoe 43 on the rear end thereof adapted to engage the periphery of the rear wheel 8, the brake shoe being normally retained out of contact with the wheel by a flat leaf spring 44 having the upper end attached to the rear side of the spacer 5 by a fastening device 45 and having its free lower end bearing against a transverse pin 46 carried by the brake rod 41 as shown in Fig. 2. The forward end of the brake rod has a reduced end 47 extending through an opening 48 in an actuating lever 49 and which is pivotally connected thereto by a pin 50. The lower end of the lever 49 is pivotally supported in an opening 51 provided in the lower member of the frame, the pivot being formed by a pin 52 extending transversely through the lower member as clearly shown in Figs. 1 and 2.

In using the coaster cycle the rider straddles the device and sits on the seat 31 with his hands gripping the handle bar 29. One foot is placed upon the footboard 39 while the other foot is used as a pusher to propel the vehicle along the ground. When the vehicle is used for coasting, the rider places both feet upon the footboard and balances the vehicle similar to the balancing of a bicycle.

From the foregoing it is obvious that I have provided a coaster cycle which is well adapted for construction from wood materials and which is of strong, rigid construction. It is also obvious that the frame provides an exceptionally rigid and strong construction with a minimum of parts and is entirely free of horizontal braces and the like.

What I claim and desire to secure by Letters Patent is:

1. A vehicle of the character described including, a frame having rearwardly converging upper and lower longitudinal members, spacers between said members, a steering post between the forward ends of said members, means mounting the steering post for turning movement between said members, arms fixed to sides of the steering post and extending below the lower longitudinal member, an axle carried by lower ends of said arms, a wheel journalled on the axle for supporting the forward end of said frame, side members having ends projecting rearwardly of the terminal end of the lower member, an axle carried by said projecting ends, and a wheel journalled on said last named axle for supporting the rear of said frame.

2. A vehicle of the character described including, a frame having rearwardly converging upper and lower longitudinal members, spacers between said members, a steering post between the forward ends of said members, means mounting the steering post for turning movement between said members, arms fixed to sides of the steering post and extending below the lower member, an axle carried by lower ends of said arms, a wheel journalled on the axle for supporting the forward end of said frame, side members fixed to said spacers and having ends projecting rearwardly of the terminal end of the lower member, an axle carried by said projecting ends, and a wheel journalled on said last named axle for supporting the rear of said frame.

3. A vehicle of the character described including, a frame having rearwardly converging upper and lower members, spacers between said members, a steering post between the forward ends of said members, means mounting the steering post for turning movement between said members, arms fixed to sides of the steering post and extending below the lower member, an axle carried by said arms, a wheel journalled on the axle for supporting the forward end of said frame, side members having ends projecting rearwardly of the terminal end of the lower member, an axle carried by said projecting ends, a wheel journalled on said last named axle for supporting the rear of said frame, a brake rod slidable through openings in said spacers, a brake shoe on the rear end of said rod for engaging the wheel supporting the rear of the frame, a spring urging the brake rod into position to support the brake shoe out of contact with said wheel, and brake rod actuating means pivotally supported by the lower of said members and having connection with the brake rod for effecting movement of the brake shoe in contact with said wheel.

4. A vehicle of the character described including, a frame having upper and lower members, spacers between said members, a steering post between the forward ends of said members, a steering wheel carried by said post for supporting the forward end of said frame, side members projecting rearwardly of the terminal end of the lower member, a wheel positioned between the side members for supporting the rear of said frame, a brake rod located between the side members and slidable through openings in said spacers, a brake shoe on the rear end of said rod for engaging the wheel supporting the rear of the frame, means urging the brake rod into position to support the brake shoe out of contact with said wheel, and brake rod actuating means carried by the lower of said members and having connection with the brake rod for effecting movement of the brake shoe in contact with said wheel.

5. A vehicle of the character described including, a lower longitudinal member, a wheel supporting the rear end of said member and journalled for rotation about an axis above said member, a steering post journalled at the forward end of said member and having depending arms extending below said member, a wheel rotatably carried by said arms below said member, an upper longitudinal member, means cooperating with the steering post for supporting the upper longitudinal member above the first named longitudinal member, and a seat on said last named longitudinal member.

6. A vehicle of the character described including, upper and lower longitudinal members, means spacing the rear ends of said members, a steering post between the forward ends of said members, lag screws extending through openings in the forward ends of said members and threaded into ends of the steering post for journalling the steering post, arms fixed to sides of the steering post, arms extending rearwardly of the lower member, and wheels journalled between said arms.

7. A vehicle of the character described including, upper and lower longitudinal members, means spacing the rear ends of said members, a steering post journalled between the forward ends of said members, arms fixed to sides of the steering post, arms extending rearwardly of the lower member, and wheels journalled between said arms.

8. In a vehicle of the character described, upper and lower longitudinal members, means spacing the rear ends of said members, a steering post between the forward ends of said members, and lag screws extending through openings in the forward ends of said members and threaded into ends of the steering post for journalling the steering post.

9. A vehicle of the character described including, a lower longitudinal member, a wheel supporting the rear end of said member and journalled for rotation about axis above said member, a steering post journalled at the forward end of said member and having depending arms extending below said member, a wheel rotatably carried by said arms below said member, an upper longitudinal member, means cooperating with the steering post for supporting the upper longitudinal member upon the lower longitudinal member, a seat on the upper longitudinal member, and a foot rest on the lower longitudinal member.

10. A vehicle of the character described including, a frame having rearwardly converging upper and lower members, spacers between said members, a steering post between the forward ends of said members, arms fixed to sides of the steering post and extending below the lower member, an axle carried by lower ends of said arms, a wheel journalled on the axle for supporting the forward end of said frame, side members fixed to said spacers and having ends projecting rearwardly of the terminal end of the lower member, an axle carried by said projecting ends, a wheel journalled on said last named axle for supporting the rear of said frame, a seat having a forward portion resting on the upper member, a spacer supporting the rear portion of said seat and having a notch for receiving the upper longitudinal member, and a fastening device carried by the seat and projectable through a series of openings in the upper member to adjustably anchor said seat.

J. W. McCORMACK.